C. R. SCHMIDT
PIPE COUPLING.
APPLICATION FILED OCT. 22, 1907.

909,029.

Patented Jan. 5, 1909.

2 SHEETS—SHEET 1.

WITNESSES

Charles R. Schmidt
INVENTOR by Connolly Bros.
Attorneys

UNITED STATES PATENT OFFICE.

CHARLES R. SCHMIDT, OF BALTIMORE, MARYLAND.

PIPE-COUPLING.

No. 909,029.  Specification of Letters Patent.  Patented Jan. 5, 1909.

Application filed October 22, 1907. Serial No. 398,630.

*To all whom it may concern:*

Be it known that I, CHARLES R. SCHMIDT, a citizen of the United States, residing at Baltimore city and State of Maryland, have invented certain new and useful Improvements in Pipe-Couplings, of which the following is a specification.

This invention has relation to pipe couplings, and has for its object the provision of a novel method and means for forming a lead seal around the joint of the coupled members or sections whereby a perfect seal is obtained in the first instance upon the application of the molten lead to the exterior of the joint and whereby the seal is maintained in a gas tight and liquid tight condition under all contingencies of expansion and contraction.

The coupling to which my invention is particularly applicable is of the type preferably employed for pipes conducting fluids under high pressure and which may comprise two faucet like members with an interposed coupling thimble or sleeve, or one faucet member and a spigot member, the spigot and faucet, or entering and receiving portions in each instance being tapered.

In carrying my invention into effect and adapting and applying the lead seal to a coupling, as for instance to a coupling having two faucet portions or members and an interposed sleeve or thimble, I so rabbet the opposing faces of the coupling flanges, and so recess the outer surface of the thimble that the lead poured over and around the joint and between the opposing surfaces of the flanges will, on cooling, not only hermetically seal the joint but will become interlocked with or anchored to the two faucet flanges and thimble and form a wedge like packing in such a way that when the pipe sections tend to separate under expansion the lead packing will be caused to assume a corresponding and compensating form, so that if the seam between the lead and iron widens at one or more points it will close at other points and thus always preserve the hermetic quality of the seal.

Figure 1:
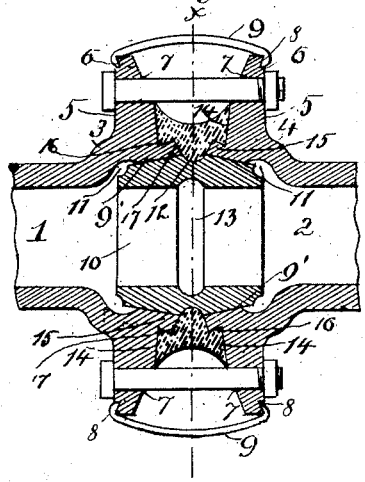
Figure 3:
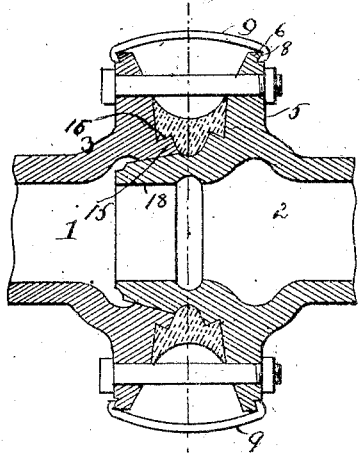
Figure 2:
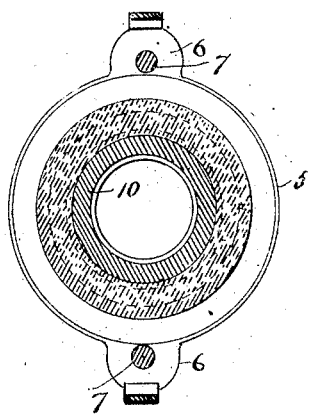
Figure 4:
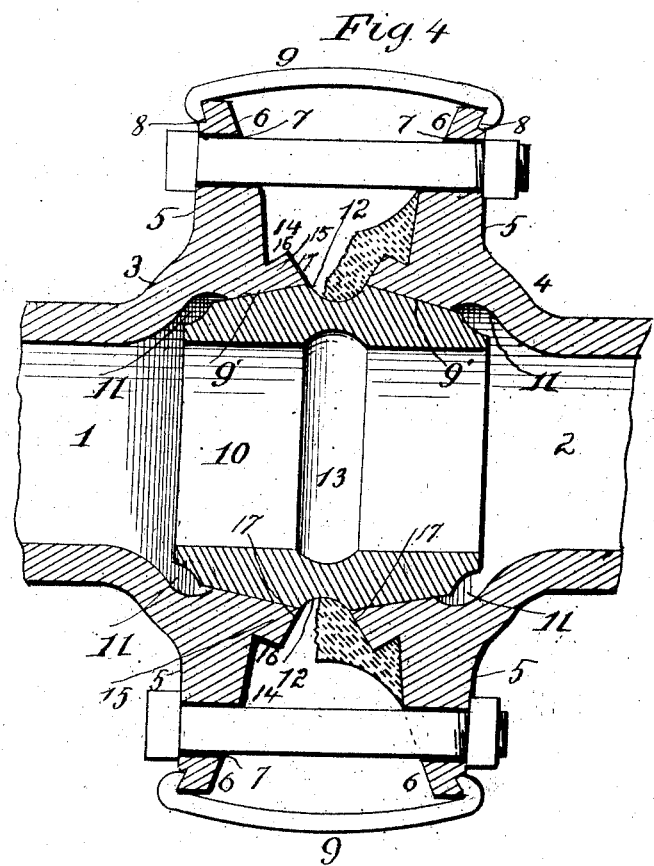

In the accompanying drawings: Figure 1 is a longitudinal sectional view of a pair of coupled faucet ended pipes with interposed thimble having the joint sealed according to my invention. Fig. 2 is a transverse sectional view of the same on the line X—X of Fig. 1. Fig. 3 is a longitudinal sectional view of a pair of coupled pipes, one having a spigot end and the other a faucet end, having the sealed joint of my invention. Fig. 4 is a longitudinal section on an enlarged scale of a pair of coupled pipes, with part of the lead filling omitted.

Referring to Fig. 1, 1 and 2 designate the pipe lengths and 3 and 4 respectively the faucet ends thereof, both faucets being alike and formed with the coupling flanges 5—5 having lugs 6, 6, pierced at 7 for the passage of bolts, and if desired, formed with undercut grooves 8, on their outer faces for the engagement of the clamps 9. The mouths of the flanges or faucet ends are interiorly tapered as shown at 9' and form seats or sockets for the reception of the tapered ends of the sleeve or thimble 10.

The faucets are preferably designed to have a certain amount of elasticity and for this purpose are recessed annularly on their interior surfaces back of the tapered sockets or seats 9', as shown at 11. The ends of the coupling thimble 10 extend far enough back in the pipes to almost cover the recesses 11, so as to maintain as far as practicable the even continuity of the bores of the pipes, reduce frictional obstruction and prevent the accumulation of solid deposits in the recesses.

The thimble is formed with an external circumferential groove 12 to receive a portion of the lead constituting the seal, and is preferably internally and annularly grooved at 13 to render the thimble somewhat elastic at the middle point and accommodate itself to flexure and strain.

The inner and opposing faces of the faucet flanges 5—5 are rabbeted at 14, 14 on converging lines by which supplementary flanges 15, 15 are produced, the upper surfaces 16, 16 of the latter being slightly undercut or dovetailed, and their facial surfaces 17, 17 made convergent towards each other in a radial direction and coincident with the sides of the groove 12 in the outlet surface of the thimble 10. When the pipes are coupled together, an annular space is left between the faucet flanges, such space being generally of a wedge shape by reason of the convergence of the surfaces 14—14, 17—17, and the sides of the thimble groove 12.

When the pipes are coupled together and the molten lead poured between the faucet flanges and around the joint, the shrinkage of the lead on cooling causes it to contract radially and to exert a tight hold on the thimble 10. The contraction of the lead is also lateral and of such a character as to exert contractile force against the undercut surfaces of the supplementary flanges 15, and as such force is lateral, that is in the direction of the axis of the pipes, the latter will be drawn towards each other and the joints tightened.

In forming the lead seal according to the usual method of casting lead seals by forming a dam around the joint, its outer surface will assume a concave form in a lateral direction and the mass will be comparatively thin at points subject to strain under expansion and contraction of the joints, and will therefore flex or bend according to the direction in which strain takes place as the pipes tend to separate, come together, or depart from axial alinement. Normally, as when the pipes are first coupled and the lead seal applied, the latter will exert the same pressure in all directions against the surfaces with which it is in contact. If, afterwards, the pipes should tend to separate axially, they will meet resistance at the points 16—16, and such separating tendency will be thus counteracted to the extent of preventing any opening at the joints. If the pipes should tend to get out of alinement any lateral contraction of the lead ring at one side or one point will be met and counteracted by a flexure, bending or stretching at another point so that in any event the opening or unsealing of the joints will be prevented.

In Fig. 3 I illustrate a modification in the character of the coupling, in which the thimble 10 is dispensed with, and one of the pipes or joint members formed with a spigot 18, the projecting portion of which is similar to a corresponding portion of the thimble. In other respects the structure shown in Fig. 3 is the same as that shown in Figs. 1 and 4, the last named being an enlarged view of the coupling shown in Fig. 1, with a part of the lead seal removed to distinctly show the anchoring recess.

Having described my invention, I claim:

1. The method of forming hermetic seals in flanged pipe couplings, which consists in providing the flanges on their outer faces with undercut annular recesses and casting molten metal around the joint and solely between said flanges so as to fill said recesses and draw the coupling members together.

2. The method of sealing flanged pipe couplings, consisting in forming annular, undercut and converging walled recesses in the outer faces of the flanges, and casting molten metal around the joint and solely between said flanges so as to fill the recesses and draw the coupling members towards each other.

3. The method of sealing flanged pipe couplings of the spigot and faucet type, consisting in forming annular undercut anchoring recesses in the outer faces of the flanges, casting molten metal around the joint and solely between the flanges and thereby anchoring the resultant seal on the flanges.

4. The method of sealing flanged pipe couplings which consists in recessing the faces of the flanges, casting a molten metal seal around the joint and solely between said flanges and into said recesses and thereby anchoring the seal to the coupled members.

5. In pipe couplings, the combination with the coupling flanges having undercut anchoring recesses forming supplementary flanges on their outer faces, of a soft metal seal surrounding the joint solely between the flanges and anchored to said coupling flanges.

6. In pipe couplings, the combination with coupling flanges having their outer surfaces formed with converging walls, and the latter rabbeted, of an annularly grooved coupling spigot and a lead packing surrounding the joint and interlocked with the flanges and engaging the spigot.

7. A pipe coupling comprising two flanged tubular members formed with annular seal anchoring recesses, a tubular spigot which enters the flanged members and is circumferentially grooved and a lead seal which surrounds the joint and which is anchored to the flange and fills the groove in the spigot.

8. A pipe coupling comprising two circumferentially flanged tubular members one of which is a faucet, a spigot and a lead seal surrounding the joint between the coupled members, and positively engaging the flanges and spigot, said flanges and said spigot being formed with anchoring recesses for the seal.

9. The method of connecting flanged pipe couplings, consisting in forming the flanges with anchoring recesses, bolting the flanges together, casting molten metal around the joint into said recesses and solely between the opposing faces of said flanges and interlocking the poured metal with the coupling members.

In testimony whereof I affix my signature, in presence of two witnesses.

CHARLES R. SCHMIDT.

Witnesses:
Thos. A. Connolly,
Jos. B. Connolly.